US012207662B2

(12) United States Patent
Wen et al.

(10) Patent No.: US 12,207,662 B2
(45) Date of Patent: Jan. 28, 2025

(54) METHOD OF USING NANOFIBER EMULSION IN BAKED FOOD

(71) Applicant: Sericultural &Agri-Food Research Institute Guangdong Academy of Agricultural Sciences, Guangzhou (CN)

(72) Inventors: Jing Wen, Guangzhou (CN); Yujuan Xu, Guangzhou (CN); Jijun Wu, Guangzhou (CN); Yuanshan Yu, Guangzhou (CN); Manqin Fu, Guangzhou (CN); Tenggen Hu, Guangzhou (CN); Haocheng Liu, Guangzhou (CN)

(73) Assignee: Sericultural & Agri-Food Research Institute Guangdong Academy of Agricultural Sciences, Guangzhou (CN)

( * ) Notice: Subject to any disclaimer, the term of this patent is extended or adjusted under 35 U.S.C. 154(b) by 0 days.

(21) Appl. No.: 18/739,941

(22) Filed: Jun. 11, 2024

(65) Prior Publication Data

US 2025/0000101 A1    Jan. 2, 2025

(30) Foreign Application Priority Data

Jun. 30, 2023  (CN) .......................... 202310804451.X

(51) Int. Cl.
*A21D 2/18* (2006.01)
*A21D 10/00* (2006.01)
(Continued)

(52) U.S. Cl.
CPC ........... *A21D 2/188* (2013.01); *A21D 10/007* (2013.01); *A21D 10/04* (2013.01); *A21D 13/80* (2017.01)

(58) Field of Classification Search
CPC ...... A21D 2/188; A21D 13/80; A21D 10/007; A21D 10/04
See application file for complete search history.

(56) References Cited

U.S. PATENT DOCUMENTS

| 4,774,099 | A | * | 9/1988 | Feeney | ................ | A21D 10/005 |
|---|---|---|---|---|---|---|
| | | | | | | 426/804 |
| 2014/0363560 | A1 | * | 12/2014 | Lundberg | ............... | A23L 29/256 |
| | | | | | | 426/615 |
| 2023/0200416 | A1 | * | 6/2023 | Fox | ........................ | A23L 29/231 |
| | | | | | | 426/577 |

FOREIGN PATENT DOCUMENTS

| CN | 103242541 A | 8/2013 |
|---|---|---|
| CN | 107903367 A | 4/2018 |
| CN | 109938246 A | 6/2019 |

* cited by examiner

*Primary Examiner* — Anthony J Weier
(74) *Attorney, Agent, or Firm* — Nitin Kaushik

(57) ABSTRACT

The present invention belongs to the technical field of nanofiber emulsion, in particular to application of nanofiber emulsion to preparation of baked food. The nanofiber emulsion is nanofiber emulsion of a pomelo peel sponge layer, and is PCNF emulsion obtained by emulsification of a nanofiber emulsion stabilizer of the pomelo peel sponge layer and an oil phase; the amount of the nanofiber emulsion in the baked food is 18-90%, and the nanofiber emulsion replaces oil in traditional baked food; when the PCNF emulsion is added to the batter, bubble density of the batter is larger, and proper addition of the PCNF emulsion can reduce specific gravity of the batter, improve aeratability of the batter with soybean oil, reduce a baking loss rate and water activity, and prolong the shelf life of the cakes with the PCNF emulsion; hardness and chewiness of the cakes can be reduced.

4 Claims, 6 Drawing Sheets

(51) Int. Cl.
*A21D 10/04* (2006.01)
*A21D 13/80* (2017.01)

METHOD OF USING NANOFIBER EMULSION IN BAKED FOOD

CROSS-REFERENCE TO RELATED APPLICATIONS

The application claims priority to Chinese patent application No. 202310804451X, filed on Jun. 30, 2023, the entire contents of which are incorporated herein by reference.

TECHNICAL FIELD

The present invention belongs to the technical field of nanofiber emulsion, in particular to a method of using a nanofiber emulsion in baked food.

BACKGROUND

In order to improve smooth taste, flavor and nutrition of food, it is usually necessary to add vegetable oil or animal oil to the food. However, in recent years, with the increasing incidence of cardiovascular diseases, obesity and other diet-related gastrointestinal diseases, consumers become more interested in low-fat and low-calorie healthy food. However, reducing fat of the food by directly changing the quantity of ingredients in the food can have a negative impact on the texture, taste, flavor, and appearance of products. Therefore, using fat mimetics to replace fat or adding fiber to the food is an effective method for the food industry to produce the healthy food without affecting its flavor.

In the field of the baked food, in most studies, polysaccharides, starch or fiber that can form gel, such as corn dextrin, or guar gum or carboxymethyl cellulose, is directly used to replace part of the fat. There are also studies in which cellulose oil gel is directly made to be applied to cakes, or protein-based emulsion, as the fat mimetic, is used in the baked food. Although the taste of the fat can be simulated, protein is a thermosensitive particle, which is prone to chemical reaction (such as Maillard reaction) when exposed to heat, which will affect the flavor and the taste of the food. Therefore, in some studies, the emulsion stabilized with bamboo shoot dietary fiber is used to replace part of the oil to be applied in biscuits, which not only can reduce intake of the fat and improve the taste, but also weak sensitivity of fiber to environment will not affect its shelf life. Therefore, fiber emulsion, as the fat mimetic, has a very good application prospect in the baked food, and conforms to a concept of the healthy food.

SUMMARY

To solve the above problem, the present invention aims to provide application of nanofiber emulsion to preparation of baked food.

The technical content of the present invention is as follows:
the present invention provides application of nanofiber emulsion to preparation of baked food, where the nanofiber emulsion is nanofiber emulsion of a pomelo peel sponge layer, and is PCNF emulsion obtained by emulsification of an emulsion stabilizer of cellulose nanofiber (PCNF) of a pomelo peel sponge layer and an oil phase;
the amount of the nanofiber emulsion in the baked food is 18-90%, and the nanofiber emulsion replaces oil in traditional baked food;
the baked food includes bread, cakes, or others;
the nanofiber emulsion of the pomelo peel sponge layer is obtained by referring to a preparation method in the patent "CN202210316612.6 NANOFIBER EMULSION STABILIZER OF POMELO PEEL SPONGE LAYER AND PREPARATION METHOD AND APPLICATION THEREOF";
preferably, specific preparation is as follows:
1) mixing the pomelo peel sponge layer with water, adjusting pH to 1.5-2.0, and performing reaction to obtain A;
2) mixing the A with an 8% sodium hydroxide solution for reaction to obtain B;
3) mixing the B with the water (the mass ratio of the cellulose to the water is 1:200), and performing homogenizing and cycling 10 times at 1400 bar, to obtain a PCNF suspension;
4) mixing the PCNF suspension with an oil phase, and performing ultrasonic emulsification to obtain nanofiber Pickering emulsion, where, in the nanofiber Pikcering emulsion, concentration of the pomelo peel PCNF suspension is 0.05-0.8 wt %, and the proportion of the oil phase is 5-60%; and
the oil phase is one or more of soybean oil, peanut oil, corn oil, and sunflower seed oil.

The beneficial effects of the present invention are as follows:
according to the application of nanofiber emulsion to preparation of baked food, the nanofiber emulsion is the PCNF emulsion, and is stable emulsion formed from cellulose nanofibers (PCNFs) of a Shatian pomelo sponge layer, the application of the nanofiber emulsion to the cakes is studied, and differences between the characteristics of batter and the cakes added with the soybean oil and those of the batter and the cakes added with the emulsion to replace the soybean oil at different fat levels or the same fat level are compared; when the PCNF emulsion is added to the batter, bubble density of the batter is larger, the batter with a fat replacement degree of 45% and 63% is finer and more uniform, and proper addition of the PCNF emulsion can reduce specific gravity of the batter, improve aeratability of the batter with the soybean oil, reduce the baking loss rate and water activity, and prolong the shelf life of the cakes with the PCNF emulsion; after the PCNF emulsion is added, the consistency coefficient of the batter of the cakes is increased; when initial fat levels are the same, addition of the PCNFs will generate transformation from the characteristics of the batter predominant in viscosity to those predominant in elasticity; when the fat replacement degree is 45%, the cakes have the maximum specific volume and the best appearance characteristics and texture state; when the PCNF emulsion is properly added (the replacement degree is less than 63%), hardness and chewiness of the cakes can be reduced, and the texture characteristics of the cakes can be improved; the PCNF emulsion can change the thermodynamic characteristics of a cake core: after the PCNF emulsion is added, due to competition between the PCNFs and starch for water, starch swelling of the cake core is delayed, and gelatinization enthalpy is increased; and sensory evaluation data indicates that when the fiber proportion of the PCNFs is large, the score of the cakes in the texture state is relatively low, the taste is rough, but the overall acceptability of all the cakes has no significant difference. In general, the PCNF emulsion, as the fat mimetic to replace the soybean oil, has the potential to maintain or improve the sensory characteristics of cake products.

DETAILED DESCRIPTION OF THE EMBODIMENTS

Figure 1:
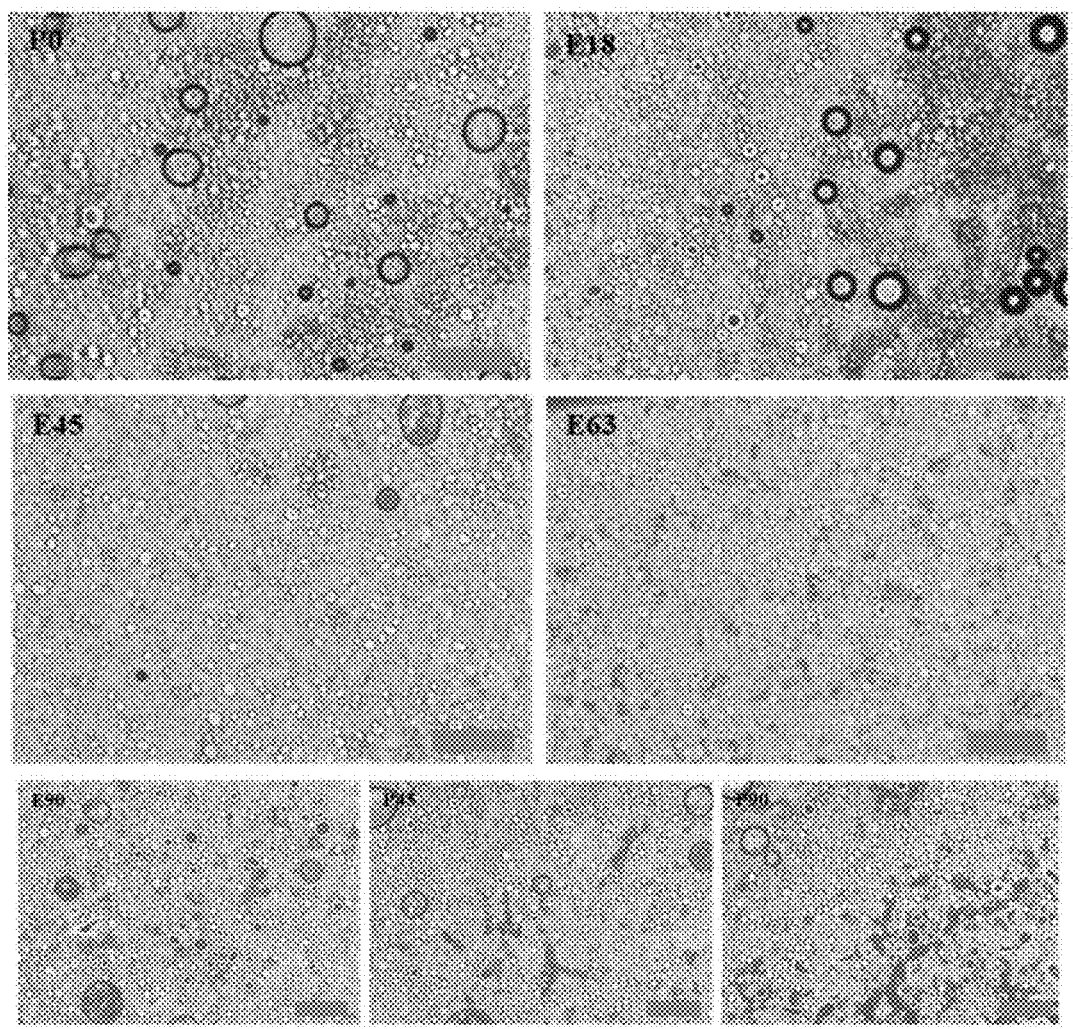
FIG. 1 shows an optical microscope view of batter made in the embodiment (with a scale length representing 50 μm)

The following provides a further detailed description of the present invention through specific embodiments and accompanying drawings. It should be understood that these embodiments are only used to illustrate the present invention without limiting the scope of protection of the present invention. After reading the present invention, modifications to various equivalent forms of the present invention by those skilled in the art are limited by the attached claims of the present application.

Used fresh Shatian pomelo was purchased from the Pedlars' market in Meizhou of Guangdong Province;
    used first-grade soybean oil was purchased from a food specialty store in Beijing;
    wheat flour, white granulated sugar, eggs, and milk powder used were all in commercially available food grade;
    instruments and equipment used were shown in Table 1:

TABLE 1

Instruments and equipment

| Name of instruments or equipment | Model | Manufacturer |
|---|---|---|
| Oven | T3-L326B | Midea Group Co., Ltd |
| Rheometer | AR-1500 | TA Company, USA |
| Water Activity Meter | GWY-66 | Shenzhen Guanya Technology Co., Ltd |
| Scanning electron microscope | VEGA-3-SBH | |
| Texture analyser | TA-XT plus | Stable Micro System Company, the United Kingdom |
| Differential scanning calorimeter | DSC200F3 | NETZSCH Company, Germany |

EMBODIMENT

Application of Nanofiber Emulsion to Preparation of Baked Food

1) Preparation of Nanofiber Emulsion:

after a dried block-shaped pomelo peel sponge layer was crushed into powder, the powder was sieved through a 60-mesh sieve, the sieved powder was mixed with water in a material-to-liquid ratio of 1:20 g/mL to obtain a solution, the pH of the solution was adjusted to 1.7, the solution was mixed and stirred in a 80° C. thermostat oscillation water bath for 2 h, filtering was performed, washing was performed with distilled water to neutral, drying was performed, a sodium hydroxide solution (8%, w/v) continued to be added in the material-to-liquid ratio of 1:20 (g/mL), stirring was performed at 75° C. for 1.5 h, filtering was performed, washing was performed with the distilled water to neutral, a hydrogen peroxide solution (8%, w/v) was added to filter residues in the material-to-liquid ratio of 1:20 (g/mL), reaction was performed in a 30° C. water bath for 30 min, the filter residues were washed with the distilled water to neutral and then washed twice with 95% alcohol, drying was performed at 60° C., and crushing was performed, whereby cellulose in the pomelo peel sponge layer can be obtained;

the cellulose of the pomelo peel sponge layer was mixed with the water, homogenizing and cycling were performed 10 times at 1400 bar, to obtain the PCNF suspension, and the concentration of the PCNF suspension was adjusted to 0.5 wt %; and the PCNF suspension was mixed with soybean oil, the proportion of the oil phase was 10%, and ultrasonic emulsification was performed at power of 300 W for 3 min to obtain nanofiber Pickering emulsion.

2) Preparation of Cakes:

eggs were taken, egg white was separated from yolk, wheat low-gluten flour was sieved and then added to the egg yolk, milk powder, water, emulsion and the soybean oil were weighed according to a formula in Table 2 and added into a mixing bowl at one time, the egg white was whipped, low-speed whipping was performed at a first gear of a stirrer, white granulated sugar was added in three times, rapid whipping was performed at a second gear, after whipping, the whipped mixture was added to a stirring container, and low-speed whipping was performed at the first gear until a uniform whipped result was achieved; an oven was preheated to 150° C. in an upper and lower heating manner, about 50 g of prepared batter of the cakes was loaded into a cake mold, and the cake mold was baked in the oven for 40 min.

TABLE 2

Formula of cakes (unit: g)

| Sample | PCNF emulsion | Soybean oil | Wheat flour | White granulated sugar | Water | Milk powder | Yolk | Egg white |
|---|---|---|---|---|---|---|---|---|
| P0 | 0 | 10 | 20 | 15 | 21.4 | 3.6 | 12.5 | 12.5 |
| E18 | 2 | 8 | 20 | 15 | 21.4 | 3.6 | 12.5 | 12.5 |

TABLE 2-continued

Formula of cakes (unit: g)

| Sample | PCNF emulsion | Soybean oil | Wheat flour | White granulated sugar | Water | Milk powder | Yolk | Egg white |
|---|---|---|---|---|---|---|---|---|
| E45 | 5 | 5 | 20 | 15 | 21.4 | 3.6 | 12.5 | 12.5 |
| E63 | 7 | 3 | 20 | 15 | 21.4 | 3.6 | 12.5 | 12.5 |
| E90 | 10 | 0 | 20 | 15 | 21.4 | 3.6 | 12.5 | 12.5 |
| P45 | 10 | 9 | 20 | 15 | 12.4 | 3.6 | 12.5 | 12.5 |
| P90 | 20 | 8 | 20 | 15 | 3.4 | 3.6 | 12.5 | 12.5 |

Note: P0: a control group without emulsion; E18, E45, E63 and E90: groups in which the PCNF emulsion (pre-emulsified soybean oil) was used to replace 18%, 45%, 63% and 90% of fat in the cakes respectively; P45, P90: groups in which a portion of the soybean oil and the water were pre-emulsified with the PCNFs to replace a part of the fat in the cakes (equivalent to adding 45 mg and 90 mg of the PCNFs respectively, with consistent overall water and fat levels).

The characteristics of the prepared batter and the characteristics of the cakes were determined as follows. All data was processed using Microsoft Excel, images were plotted using Origin 2018, and statistical analysis was performed using SPSS 17.0 software, where $p<0.05$ indicates significant differences. Three parallel experiments were performed for each group of experiments, and the data was expressed as mean±standard deviation.

1. Determination of the Characteristics of the Batter

1) Observation of Microstructure of the Batter

An optical microscope was used to observe the microstructure of the batter (not diluted with deionized water). A specific method was as follows: in order to prevent liquid drops from stacking, the batter was diluted 10 times with the deionized water, 20 μL of the diluted batter was deposited on a glass slide with grooves, and covered with a cover glass, and the liquid drops of the emulsion were observed with a 20× objective lens.

As for the microstructure of the batter, the size, number and distribution uniformity of bubbles in the batter were observed mainly. The results are shown as FIG. 1, the size of the bubbles of different batter is different. Larger bubbles exist in the batter of the cakes in groups P0 and E18. With the increase of replacement amount of the PCNF emulsion, the number of the bubbles in the cakes of groups E45 and E63 becomes more, and finer and more uniform bubbles were distributed, which is conducive to formation of fine pores in the cake core and increase of volume of the cakes. In addition, a small number of abnormal bubbles with larger diameters appear in the cakes of groups E90, P45, and P90. Herein, the cakes of a group E90 are obtained by replacing 90% of the fat in the cakes of the group P0, and appearance of abnormal bubbles may be the reason for sudden reduction of fat crystals. A network structure of the stable bubbles was partially destroyed. Due to the same initial fat level of the cakes of the groups P45 and the P90, the reason for the occurrence of the abnormal bubbles may be the increase in the PCNFs increases viscosity of a batter system to enable the large bubbles not to escape from the batter, indicating that the stability of the bubbles is affected by the PCNFs in a batter matrix. Excessive size and irregular distribution of the bubbles in the batter can affect the final volume of the cakes. It is worth noting that compared with the batter in a control group, the bubble density of all the batter added with the PCNF emulsion is larger and more uniform.

2) Specific Gravity of Batter and Baking Loss Rate

The specific gravity of the batter has a significant impact on the quality of the cakes, reflecting the ability of the batter to maintain air during a stirring process. The specific gravity of the batter is determined by comparing the weight of the batter and the weight of the water with the same volume as the batter. A plastic cup was taken, and the weight of the plastic cup was weighed to be denoted as $W_0$; the plastic cup was filled with the deionized water and the total weight was weighed to be denoted as $W_1$; and the plastic cup was emptied and filled with the batter, and the total weight was weighed to be denoted as $W_2$.

The specific gravity of the batter was calculated according to formula (1).

$$\text{Specific gravity of batter is} = (W_2 - W_0)/(W_1 - W_0) \qquad (1)$$

The water loss of the cakes before and after baking was determined. Before baking, about 100 g of the batter was weighed and added into the mold, and the total weight $W_1$ of the batter and the mold was recorded; and after baking, the total weight of the cakes and the mold was weighed to be denoted as $W_2$.

The baking loss rate was calculated according to formula (2).

$$\text{Baking loss rate} = \frac{(W_1 - W_2)}{W_1} \times 100\% \qquad (2)$$

The specific gravity of the batter was a key indicator of the cakes, reflecting the ability of the batter to maintain air during the whipping process, which has a significant impact on quality of the cakes. The higher the specific gravity, the higher air filling capacity. The results are shown as Table 4. There is no significant difference in the specific gravity of the batter between samples added with the PCNF emulsion and samples without the PCNF emulsion, but the specific gravity of the batter of the samples added with the PCNF emulsion is significantly less than that of the group P0, indicating that after the PCNF emulsion is added, aeration quantity of the batter can be improved, which is similar to results obtained by an optical microscope. The bubbles are small in size and large in quantity, which is conducive to more uniform pore distribution. Research reports showed that after an emulsifier was added, the stability of the bubbles can be improved, and different types of oil can also affect the aeratability of the batter. However, the soybean oil has a weaker ability to fill and stabilize the bubbles. By adding the appropriate PCNF emulsion, the aeratability of the batter with the soybean oil can be improved, thereby having a positive impact on improving the quality of the cakes.

TABLE 4

Specific gravity of batter and baking loss rate

| Sample | Specific gravity of the batter | Baking loss rate |
|---|---|---|
| P0  | 0.544 ± 0.006$^a$   | 7.26 ± 0.76$^a$ |
| E18 | 0.539 ± 0.001$^{ab}$ | 7.13 ± 0.62$^a$ |
| E45 | 0.537 ± 0.003$^b$   | 7.16 ± 0.75$^a$ |
| E63 | 0.537 ± 0.001$^b$   | 7.04 ± 0.05$^a$ |
| E90 | 0.536 ± 0.002$^b$   | 7.05 ± 0.14$^a$ |
| P45 | 0.539 ± 0.002$^{ab}$ | 5.67 ± 0.53$^b$ |
| P90 | 0.535 ± 0.003$^b$   | 4.85 ± 1.01$^b$ |

Note:
$^{a\text{-}b}$indicates significant differences between values in the same column (p < 0.05).

Note: a-b indicates significant differences between values in the same column (p<0.05).

The baking loss rate was an important attribute of measuring the ability of the cakes to retain water during the baking process. As can be seen from Table 4, in cake groups E18-E90, due to different water content in each group, the cakes added with more emulsion had a higher amount of fiber, and the overall added water was also higher. It is worth noting that when the amount of the added water gradually increased, there was no significant difference in the baking loss rate between the cakes of the groups E18-E90 or between the cakes of the groups E18-E90 and the cakes of the group P0, which was about 7%. In addition, when the overall water addition is consistent, the baking loss rate of the cakes of the group P45 and the group P90 is significantly lower than that of the group P0. The results may be caused by that a disordered network with the PCNFs strongly wounded can be cross-linked with protein to form a three-dimensional network, facilitating prevention of the loss of fat and water, thereby reducing the baking loss rate. Moreover, the hydrophilicity of the PCNFs also makes the PCNFs have good water retention properties like other hydrocolloids. The above results indicated that a stable batter system can be formed by pre-emulsifying the soybean oil. It can be seen that excessive water loss will lead to dry taste and poor quality of the cakes, indicating that the PCNF emulsion, as a fat substitute, has the potential to improve the taste and quality of original cakes.

3) Rheological Characteristics of the Batter

A rheometer equipped with a 40 mm parallel plate was used to characterize rheological characteristics of the batter. During testing, a gap value was set to 1.0 mm and the temperature was 25° C. For dynamic viscoelasticity testing, strain scanning was performed at a fixed frequency of 10 Hz (in a strain variation range of 0.1-10%) to determine a linear viscoelasticity zone. 0.5% was selected as a specific strain value for frequency scanning, and an elastic modulus (G') and a loss modulus (G") when the frequency changes from 0.1 Hz to 10 Hz were recorded. For steady-state shear viscosity analysis, a shear rate was set in the range of 0.1-100 s$^{-1}$, and apparent viscosity (n) of the sample was recorded as a function of the shear rate.

Figure 2:
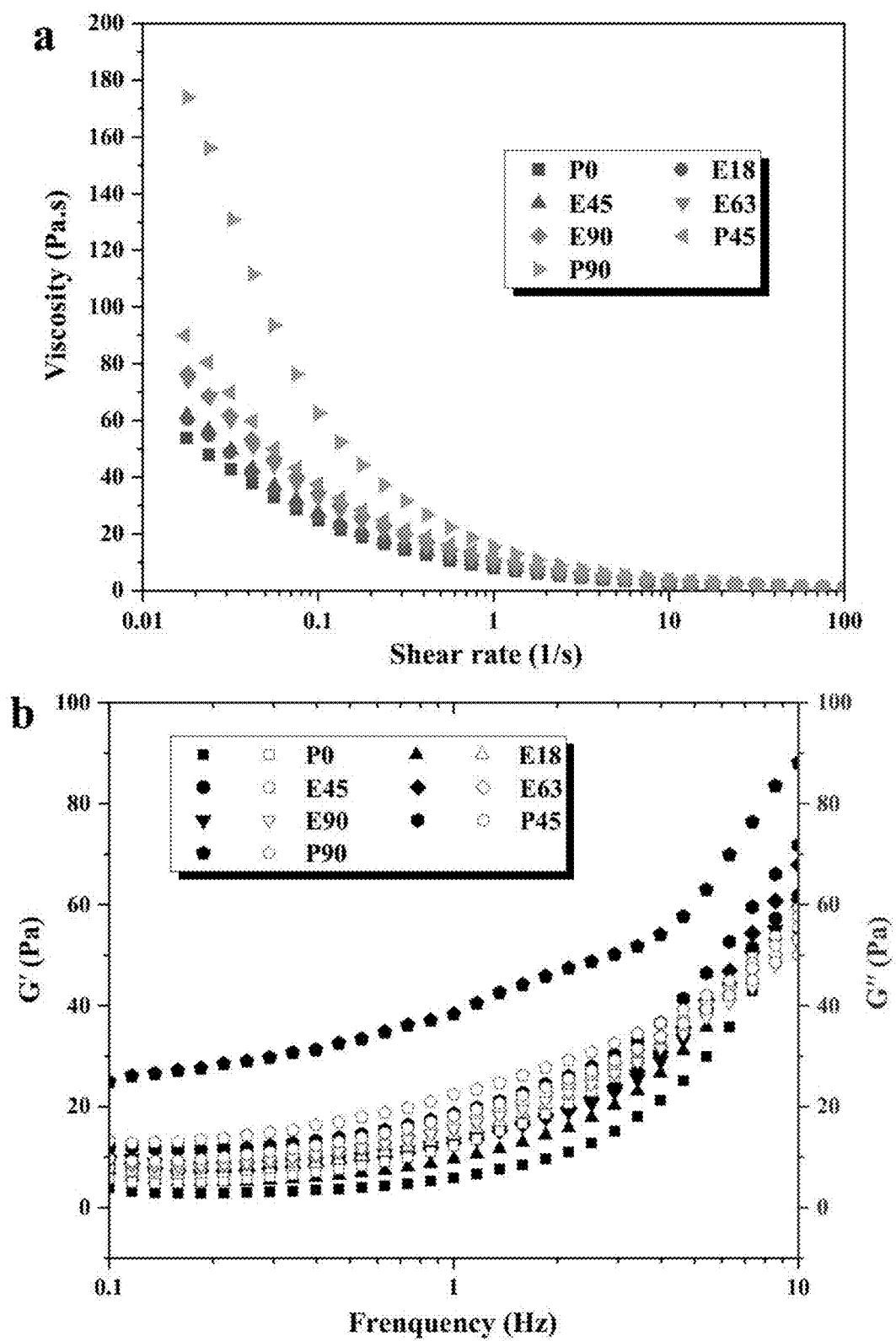
FIG. 2 shows a viscosity curve of batter made in the embodiment and a frequency correlation curve of a storage modulus G'.

Determining the viscosity of the batter of the cakes is crucial as it directly affects formation and stability of the bubbles in the batter during the baking process, and indirectly affects volume and texture parameters of the cakes. The apparent viscosity of the batter was measured by the rheometer, and a viscosity curve was shown in FIG. 2. All the batter exhibited shear thinning behaviors, indicating that the apparent viscosity of the batter decreased with increase in the shear rate. The changes in shear stress were fitted using a Herschel-Bulkley model, and the results are shown in Table 5. As shown in the table, a flow index n of all the batter was less than 1, indicating that all the batter belonged to non-Newtonian fluid. In addition, the smaller the value of n, the stronger the degree of pseudoplasticity of the sample. Herein, the group P0 had the highest flow index n, and after the PCNF emulsion was added, the flow index of all the batter decreased significantly, indicating that adding the PCNF emulsion can improve the degree of pseudoplasticity of the batter. It is worth noting that the consistency of the batter can also affect the stability of small bubbles, thereby affecting the quality of final products. The consistency coefficient of the batter in the control group was the smallest, and the consistency index of all the batter containing the PCNF emulsion was higher than that of the group P0, which may be because the PCNFs have high water holding capacity or high water binding capacity, thereby reducing the amount of free water that can be used to promote movement of particles in the batter, and the batter had a high consistency index. In addition, in the groups P45 and P90, as the fiber concentration increased, the consistency coefficient also increased and the value of n decreased, indicating greater flow resistance and more entangled structures. This was because increase in the amount of the fiber leads to enhanced water absorption ability of the batter.

TABLE 5

Fitting value of Herschel-Bulkley model for the batter

| Sample | K (Pa · S) | Flow index (n) | R$^2$ |
|---|---|---|---|
| P0  | 8.004 ± 0.202  | 0.515 ± 0.006 | 0.999 |
| E18 | 9.958 ± 0.795  | 0.427 ± 0.018 | 0.993 |
| E45 | 10.917 ± 1.030 | 0.408 ± 0.020 | 0.990 |
| E63 | 10.459 ± 0.458 | 0.453 ± 0.010 | 0.998 |
| E90 | 10.153 ± 0.359 | 0.487 ± 0.009 | 0.999 |
| P45 | 14.504 ± 1.725 | 0.404 ± 0.026 | 0.984 |
| P90 | 16.905 ± 1.543 | 0.369 ± 0.019 | 0.990 |

Figure 3:
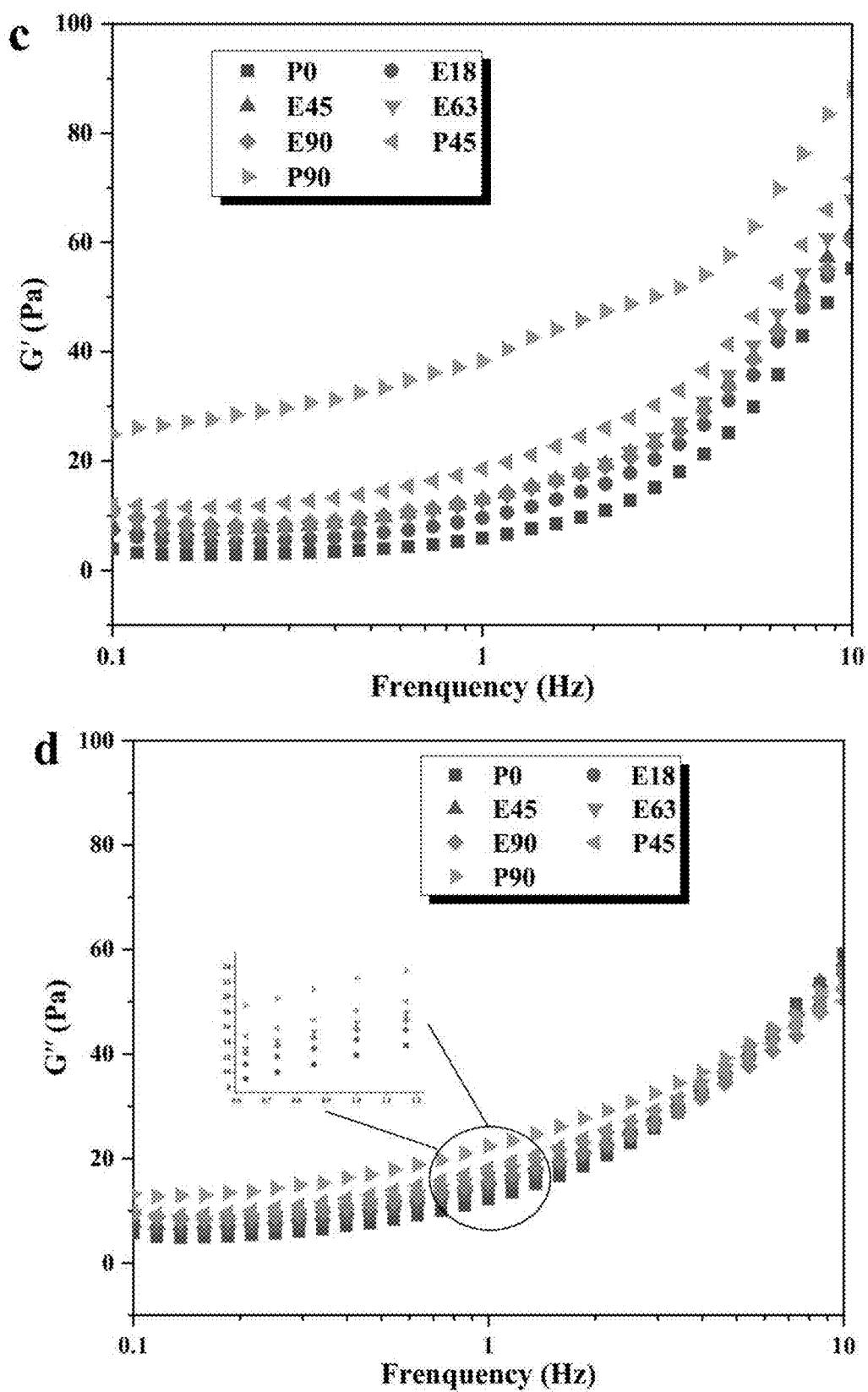
FIG. 3 shows a frequency correlation curve of a storage modulus G' and a loss modulus G" of batter made in the embodiment.

The storage modulus (G') and the loss modulus (G") of the batter of the cakes are shown in FIG. 3. The G' and G" values of all the samples increased with the increase of frequency, showing a frequency dependent relationship. Moreover, all the cake batter containing the PCNF emulsion had higher storage and loss moduli than those of the group P0. In the batter with different replacement degrees and control, G" was greater than G', indicating that a gluten structure was mainly predominant in viscosity. There were not significant differences between the moduli of the batter in the groups E45, the E63 and the E90, but the moduli were greater than those in the group E18, which may be related to the increase of water and increase of the addition amount of filamentous fiber in the gluten structure. Further, the impact of adding the PCNF emulsion (the groups P45 and the P90) at the same fat levels on viscoelasticity of the batter was studied. It was found that with the increase of the PCNF emulsion, the two moduli increased significantly, which was consistent with the results of a higher consistency coefficient, indicating that more fiber having water binding ability can combine more water, leading to the decrease of the amount of the free water. Since the two moduli were very sensitive to water content, the moduli increased with the decrease of the free water in the batter.

It is worth noting that G' of the groups P45 and the P90 was greater than G" of the groups P45 and the P90, which was completely opposite to other batter, indicating that the batter changed from a liquid behavior to a weak gel state (solid behavior). Therefore, it can be seen that the addition of the PCNFs enhanced the structure of the batter, which was consistent with the result that the increase of the concentration of the PCNFs led to the enhancement of a three-dimensional network structure, and may also be related to the enhancement of protein interaction. In summary, by adjusting the ratio of the PCNF emulsion to oil-water, the batter can show different rheological characteristics.

2. Determination of Characteristics of the Cakes

1) Specific Volume of the Cakes

After the baked cakes were cooled for 1 h, the volume V and mass m of the cakes were determined. The ratio of volume to mass is the specific volume of the cakes, and the results are shown in Table 6:

TABLE 6

Specific volume and water of the cakes

| Sample | Specific volume (cm³/g) | Water content (%) | | Water activity | |
|---|---|---|---|---|---|
| | | 1 day | 7 days | 1 day | 7 days |
| P0 | 4.80 ± 0.21$^d$ | 34.22 ± 1.83$^e$ | 33.87 ± 1.19$^c$ | 0.967 ± 0.004$^a$ | 0.969 ± 0.004$^a$ |
| E18 | 4.77 ± 0.01$^d$ | 36.52 ± 1.52$^{cd}$ | 35.43 ± 1.86$^{bc}$ | 0.958 ± 0.004$^b$ | 0.957 ± 0.006$^b$ |
| E45 | 5.60 ± 0.03$^a$ | 37.94 ± 0.85$^{bc}$ | 37.25 ± 3.18$^{abc}$ | 0.952 ± 0.007$^b$ | 0.951 ± 0.006$^b$ |
| E63 | 5.34 ± 0.01$^b$ | 39.92 ± 0.93$^{ab}$ | 38.04 ± 2.21$^{ab}$ | 0.956 ± 0.005$^b$ | 0.949 ± 0.009$^b$ |
| E90 | 5.04 ± 0.02$^c$ | 41.02 ± 1.04$^a$ | 40.44 ± 1.16$^a$ | 0.928 ± 0.004$^c$ | 0.930 ± 0.003$^c$ |
| P45 | 5.23 ± 0.02$^{bc}$ | 35.45 ± 0.89$^{de}$ | 35.62 ± 0.78$^{bc}$ | 0.955 ± 0.007$^b$ | 0.952 ± 0.006$^b$ |
| P90 | 3.92 ± 0.05$^e$ | 37.53 ± 0.40$^{cd}$ | 37.13 ± 1.22$^{abc}$ | 0.936 ± 0.005$^c$ | 0.936 ± 0.003$^c$ |

Note:
$^{a-e}$indicates significant differences between values in the same column (p < 0.05).

Note: a-e indicated significant differences between values in the same column (p<0.05).

Figure 4:
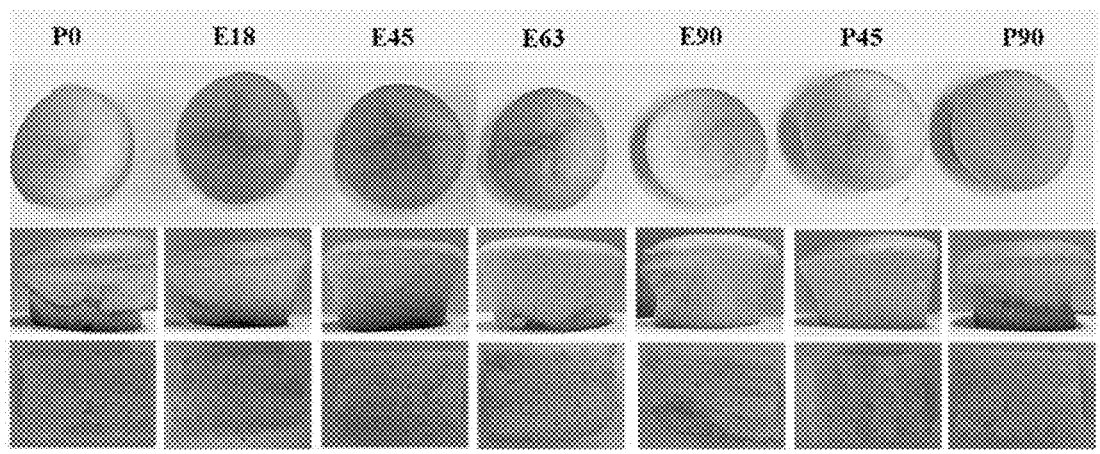
FIG. 4 shows diagrams of appearance and cut surfaces of cakes made in the embodiment.

As shown in FIG. 4, the appearance and the diagram of cut surfaces of different PCNF emulsion cakes are shown. It can be seen from the figure that all the cakes had relatively good appearance, and had slightly sunken parts and slightly cracked surfaces. This may because a swelling degree of the cakes during baking was large and tops were broken through to cause cracks, which was a normal phenomenon. From the perspective of the cut surfaces, the cut surfaces of the control cakes are sticky, while compared with those of the group P0, the cakes added with the PCNF emulsion have more pores and more uniform distribution, and the cut surfaces are more uniform and clearer in texture. In addition, the cakes of the groups E45, E63, and E90 have greater swelling degree and better texture than those of the cakes of the groups P0 and E18, but the cakes of the group E90 show slight shrinkage deformation. The results indicated that in order to improve the appearance characteristics of the cakes, it was suitable to use the PCNF emulsion to directly replace 45% and 63% of the fat in the cakes. In addition, the cakes of the group P90 were slightly larger in pores and rougher, and there was also severe shrinkage deformation. Such effect may be related to the viscosity of the batter. Compared with situations in other groups, the higher viscosity of the batter of the group P90 would hinder the swelling of the cakes and reduce the volume of the cakes, and would have an impact on the added air. Therefore, when the initial fat levels of the cakes were the same, the specific volume can be increased by appropriately increasing the proportion of the PCNFs to maintain or improve the appearance and texture of the cut surfaces of the cakes.

On the other hand, the specific volume of the cakes can affect the texture characteristics of the cakes, such as hardness, elasticity, and chewiness. Generally speaking, the cakes with higher specific volume had greater swelling degree and more fluffy and soft textures. The results of the specific volume measured after cooling the cakes are shown in Table 6. The results showed that the specific volume of the cakes added with different PCNF emulsion formulations had significant differences. The cakes in the groups E45, E63, E90 and P45 had greater specific volume than that in the group P0, and the cakes in the group E45 had the largest specific volume. With the increase of the replacement degree, the specific volume decreased significantly, while the cakes in the group P90 had the smallest specific volume. Combining with FIGS. 1 and 2, it can be seen that the specific volume of the cakes may be influenced by the viscosity of the batter, the number and the size of the bubbles added to the batter, and the ability of the batter matrix to maintain the bubbles, whereby reflected laws were the same as the appearance pattern of the cakes.

2) Water Content and Water Activity of the Cakes

The water activity of the cakes stored for 1 day, 7 days and 14 days was measured with a water activity meter, and the water content of the cake core was measured with reference to Qi Keyu's method (based on the research on construction and application of edible polymer-based gel oil). After being taken out from the oven, the cakes were cooled to room temperature, the cake core was taken and weighed to be denoted as $M_1$; and after being dried at 105° C., the cake core was weighed to be denoted as $M_2$.

The water content was calculated according to formula (3):

$$\text{Water content of the cake core is} = \frac{(M_1 - M_2)}{M_1} \times 100\% \qquad (3)$$

Water was one of the most critical factors in evaluating the quality of baked products, which is closely related to hardness of the cakes. In addition, evaluating the water activity was an effective method for predicting food stability and safety, as it was related to microbial growth and food spoilage. It can be seen from Table 6 that the water content of the cakes with replacement with the PCNF emulsion was about 35%-40%, and higher than that of the cakes in the control group (P0), but the water activity was significantly lower than that of the cakes in the control group. Herein, in the groups E18-E90, the water content was inversely proportional to the content of the soybean oil, because the decrease in the content of the soybean oil was compensated by using water colloids. In addition, although the water content added to the formula of raw batter of the groups P45 and the P90 was the same as that of the group P0, the water content significantly decreased after baking, possibly due to a large aspect ratio and good water retention properties of the PCNFs. In addition, the water content of the cakes was also closely related to an aging rate of the cakes. The key to slow down the aging rate was to reduce the water loss rate during storage. Therefore, it can be seen from the table that the water loss rate of the cakes did not change significantly when the PCNF emulsion was directly used to replace the soybean oil. However, compared with those of other groups, the dehydration rate of the cakes in the groups P45 and the P90 was low. The results indicate that when the amount of water added in the formula is consistent, the aging rate of the cakes can be slowed down through pre-emulsification of the soybean oil with the PCNFs. In addition, decrease of the water activity of all the emulsion cakes indicates that replacing the soybean oil with the PCNF emulsion is a potential way to prolong the shelf life of the cakes.

3) Texture of Cakes

The cakes were cut into uniform slices of 10 mm and a texture analyser equipped with a 20 mm cylindrical probe was adopted to determine the full texture of a middle slice cake core, including parameters such as hardness, elasticity, chewiness, and cohesiveness.

The measurement parameters were: pre-measurement speed, during-measurement speed, and post-measurement speed were 1.0 mm/s, triggering force was 5.0 g, a compression ratio was 50%, a triggering mode was automatic, and two compression cycles were conducted with an interval of 12 s.

Texture analysis was one of the most useful analytical methods in product development, which is suitable for quantifying the effects of flour mixtures and additives on physical properties of the cakes. The texture of food can be determined through instrumental analysis or sensory evaluation. The instrumental analysis was more convenient to use compared with the sensory evaluation. Through the analysis, mainly mechanical properties of materials when subjected to controlled force were evaluated, and a deformation curve of the material response generated from it was recorded.

The effect of the PCNF emulsion on the texture characteristics of the cakes was evaluated by analyzing the hardness, the elasticity, the cohesiveness, the gumminess and the chewiness (Table 7). Herein, the hardness represented the total amount of force required during the shearing process. The elasticity referred to ability of the sample to recover to the original state after compression. It can be seen from the table that the hardness of the cakes in the groups E18 and the E45 is smaller than that in the control group, and there is no significant difference in the elasticity. With the increase in the replacement degree of the PCNF emulsion (the groups E63 and E90), the hardness of the cakes is significantly improved, and the elasticity is smaller, indicating that appropriate addition of the PCNF emulsion can make the cakes softer. Generally speaking, fat is crucial in the texture of the cakes, as it has a significant effect on the stability of the batter and the cakes during processing. In fact, only removing the fat without supplementing with the fat substitute having corresponding functions can induce having corresponding functions will induce a decrease in the hardness. Therefore, lower hardness in the groups E18 and the E45 is attributed to the decrease in the soybean oil, when the replacement degree increases, the structure of the cakes becomes more robust, which is consistent with the results of the groups P45 and the P90 which have the same fat levels. It is because many PCNFs have higher strength and stiffness, and can form a rigid mesh. In addition, the increase in the hardness may also be related to the water activity. Generally speaking, the hardness is higher if water content is small.

For oil-in-water emulsion stabilized with the PCNFs, as a water phase is a continuous phase, significant evaporation of the water may be caused to increase the hardness of the cakes, but there may be chemical interaction between a moderate quantity of fiber particles and gluten or starch, leading to a more stable oil-water interface to reduce the loss of free water, thereby leading to a decrease in the hardness. When the PCNF emulsion completely replaces the soybean oil, the hardness increases due to lower water activity.

TABLE 7

Texture characteristics of the cakes

| Sample | Hardness | Elasticity | Cohesiveness | Gumminess | Chewiness |
|---|---|---|---|---|---|
| P0 | 444.53 ± 20.64$^{bc}$ | 0.87 ± 0.05$^{a}$ | 0.64 ± 0.03$^{ab}$ | 286.00 ± 14.25$^{b}$ | 248.19 ± 18.10$^{b}$ |
| E18 | 434.58 ± 29.60b$^{cd}$ | 0.83 ± 0.01$^{ab}$ | 0.62 ± 0.02$^{b}$ | 271.76 ± 27.03$^{bc}$ | 222.75 ± 27.78$^{c}$ |
| E45 | 411.90 ± 26.03$^{d}$ | 0.84 ± 0.03$^{ab}$ | 0.64 ± 0.01$^{ab}$ | 263.67 ± 15.10$^{c}$ | 220.96 ± 16.83$^{c}$ |
| E63 | 458.24 ± 11.31$^{b}$ | 0.82 ± 0.03$^{b}$ | 0.62 ± 0.02$^{b}$ | 285.37 ± 8.75$^{b}$ | 237.68 ± 7.36$^{bc}$ |
| E90 | 520.69 ± 12.94$^{a}$ | 0.83 ± 0.01$^{b}$ | 0.66 ± 0.01$^{a}$ | 342.54 ± 5.30$^{a}$ | 283.68 ± 7.59$^{a}$ |
| P45 | 431.31 ± 13.96$^{cd}$ | 0.82 ± 0.01$^{b}$ | 0.62 ± 0.01$^{b}$ | 269.76 ± 10.46$^{bc}$ | 220.64 ± 3.44$^{c}$ |
| P90 | 518.08 ± 20.08$^{a}$ | 0.82 ± 0.01$^{b}$ | 0.66 ± 0.02$^{a}$ | 339.15 ± 6.06$^{a}$ | 279.93 ± 5.85$^{a}$ |

Note:
$^{a-d}$indicates significant differences between values in the same column (p < 0.05).

Note: a-d indicates significant differences between values in the same column (p<0.05).

The cohesiveness reflects the deformation degree of the cakes before cracking, and the addition of different PCNF emulsion has no significant effect on the cohesiveness of the cakes. The chewiness reflects chewing resistance of the cakes. The results show that change trends of the chewiness and hardness of the cakes after added with the PCNF emulsion are similar. It is reported that the hardness and the chewiness are negatively correlated with the mass of the cakes. Therefore, the quality of the cakes in the groups E90 and the P90 is worse than that in the control group. However, in general, the texture characteristics of the cakes can be improved through proper replacement of the soybean oil with the PCNF emulsion or pre-emulsification of part of the soybean oil, and acceptance of consumers is enhanced.

4) Thermal Performance of the Cakes

The thermal performance of the cakes was studied using a differential scanning calorimeter. Referring to methods (Physicochemical, structural and functional properties of pomelo sporty issue, modified by different green physical methods: A comparison) edited by Zhang et al., slight modification was performed. 7 mg of a cake core sample was sealed in an aluminum alloy crucible, and all samples were heated in a nitrogen environment at a heating rate of 30 K/min from 10° C. to 300° C. An empty aluminum pot was used as a blank control to determine a DSC curve of the sample.

Figure 5:
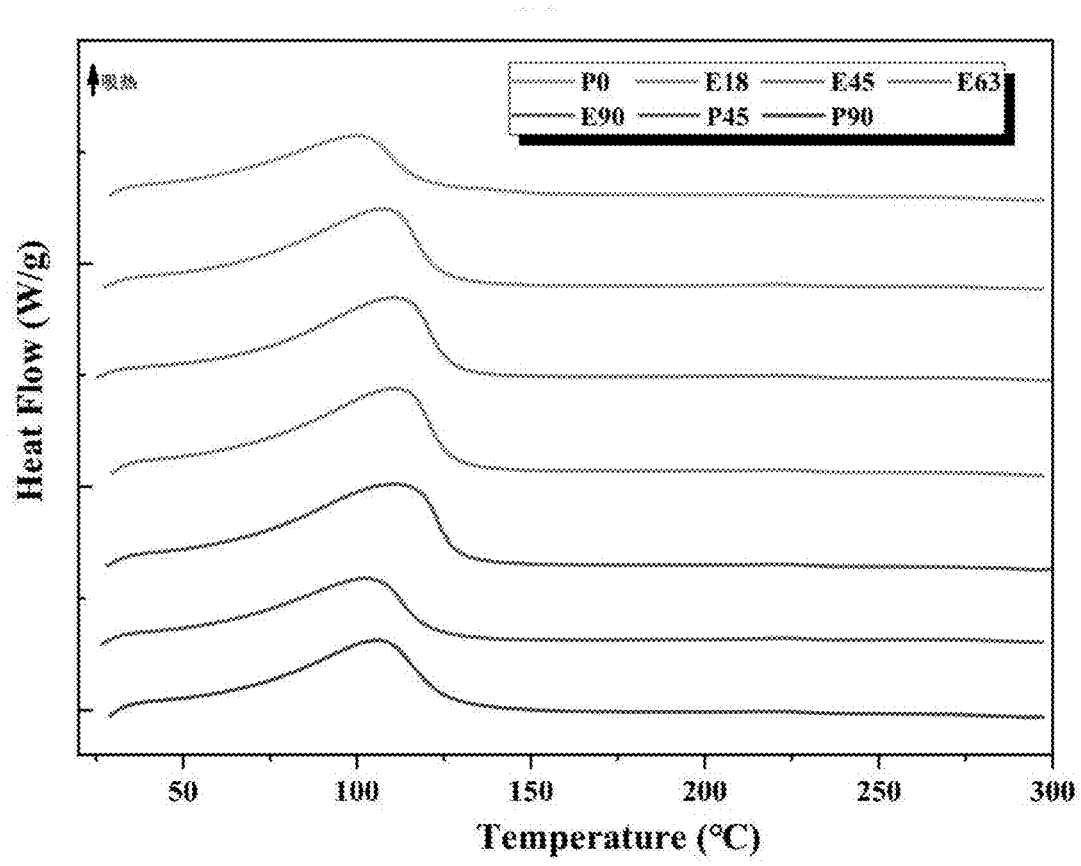
FIG. 5 shows a DSC thermal curve of cakes made in the embodiment.

The gelatinization degree plays an important role in the texture and quality of fresh baked products, and can affect the shelf life of the products. The type of the baked products (depending on the product formula and process) determines the gelatinization degree of the starch. Generally speaking, the starch was completely gelatinized on the crusts of the cakes, while the cake core (central part) was not fully gelatinized. Therefore, DSC analysis was not performed on the crusts of the cakes in the present embodiment. The DSC curve of all cake core samples is shown in FIG. 5, and there are obvious endothermic peaks in the DSC thermal curves of all the cakes (the curves from top to bottom in FIG. 5 are groups P0, E18, E45, E63, E90, P45, and P90, respectively).

As shown in Table 8, compared with those in the control group, $T_0$, $T_p$, $T_c$ and ΔH values of the cakes added with the PCNF emulsion significantly increased, which may be due to the competition between sugar and fibers for water, leading to a decrease in water availability. This is consistent with the results of the water activity, and presence of the free water in a system may be the most important factor for controlling starch swelling. The presence of the PCNFs limits or delays the swelling of the starch particles (with smaller $T_0$ values). During the melting process, the PCNFs have strong water binding ability, and after more water is absorbed, the water cannot be used for gelatinization of the starch. Therefore, the starch particles will melt at high temperatures, and less energy is required to damage their structure. In addition, it is worth noting that with the increase of the replacement degree of the PCNF emulsion, ΔH also increased, which may be related to water migration and the hardness of the cakes.

TABLE 8

Thermodynamic characteristics of the cakes

| Sample | Initial temperature $T_0$ (° C.) | Peak temperature $T_p$ (° C.) | Termination temperature $T_c$ (° C.) | Gelatinization enthalpy $\Delta_H$ (J/g) |
|---|---|---|---|---|
| P0 | 59.93 ± 1.17$^d$ | 94.90 ± 1.71$^d$ | 112.07 ± 2.49$^e$ | 460.77 ± 23.36$^f$ |
| E18 | 70.03 ± 0.47$^{ab}$ | 107.60 ± 0.46$^b$ | 124.17 ± 0.85$^c$ | 707.83 ± 53.61$^{cd}$ |
| E45 | 71.80 ± 0.44$^a$ | 110.47 ± 0.65$^a$ | 127.40 ± 0.95$^{ab}$ | 783.03 ± 24.14$^{bc}$ |
| E63 | 70.40 ± 1.87$^{ab}$ | 111.53 ± 0.38$^a$ | 127.77 ± 1.44$^{ab}$ | 831.37 ± 45.22$^{ab}$ |
| E90 | 69.20 ± 1.59$^b$ | 112.27 ± 3.36$^a$ | 129.47 ± 3.07$^a$ | 885.77 ± 76.19$^a$ |
| P45 | 65.47 ± 1.15$^c$ | 102.67 ± 1.25$^c$ | 120.53 ± 1.27$^d$ | 615.07 ± 32.29$^e$ |
| P90 | 70.97 ± 0.31$^{ab}$ | 107.37 ± 1.22$^b$ | 125.67 ± 0.21$^{bc}$ | 682.27 ± 6.54d$^e$ |

Note:
$^{a-f}$indicates significant differences between values in the same column (p < 0.05).

Note: a-f indicates significant differences between values in the same column (p<0.05).

5) Sensory Evaluation of the Cakes

The sensory quality of the cakes was evaluated based on a rating table in Table 3, and the samples were randomly numbered before evaluation. Firstly, basic training was performed on 15 sensory evaluators, and then the sensory evaluators rated shape, color, taste, texture, overall acceptability, etc. of the cakes.

TABLE 3

Sensory score table

| Evaluation items | Rating standard | Scoring standard |
|---|---|---|
| Appearance | Full and regular in block shapes, free from cracks, smooth surfaces without spots, and free from sunken parts | 7-10 |
| | Not large but round in block shapes, inapparent cracks, slight bubble ring patterns in surfaces and slight sunken parts | 4-6 |
| | Inconsistent size, large defects and cracks, large ring patterns in surfaces, and shrinkage deformation and depression | 0-3 |
| Color | Golden yellow or light brown, uniform and consistent in color, and free from burning and whitening phenomena | 7-10 |
| | Dark yellow or deep brownish red, and basically uniform in color, and less burning and whitening phenomena | 4-6 |
| | Brownish black, poor and uneven in color, and massive burning and whitening phenomena | 0-3 |
| Smell | Pure egg flavor and milk flavor, and free from peculiar | 7-10 |
| | Slightly weak egg flavor and milk flavor, and slight peculiar smell | 4-6 |
| | Weak flavor, and obvious rancid, scorched or fishy smell | 0-3 |
| | Soft and elastic, uniform pore size in the cut surfaces, and uniform and clear texture | 7-10 |
| Texture | Slightly weak softness and elasticity, with slightly uneven pores in the cut surfaces, and slightly rough texture | 4-6 |
| | Poor softness and elasticity, with uneven pore size in the cut surfaces, and rough and unclear texture | 0-3 |

TABLE 3-continued

Sensory score table

| Evaluation items | Rating standard | Scoring standard |
| --- | --- | --- |
| | Soft and palatable, not sticky, not gritty, and free from any gravel feeling when being chewed | 7-10 |
| | Slightly soft, slightly tough, slightly dry, and have a slight gravel feeling when being chewed | 4-6 |
| Taste | Poor taste, tough and rough, sticky to the teeth, and have an obvious gravel feeling when being chewed | 0-3 |
| Overall acceptance | Highly preferred (7-10 points); preferred (4-6 points); not preferred (1-3 points) | |

The sensory evaluation of the quality of the cakes was based on personal judgment and subjective qualitative evaluation, and the results reflected preferences of consumers, rather than absolute results. The effect of adding different proportions of the PCNF emulsion on the sensory properties (the appearance, the color, the smell, the texture, the taste and the overall acceptance) of the control cakes was shown in FIG. 6. Generally speaking, evaluation of the effects of the fat mimetic depends on whether the fat mimetic can improve or at least retain the functional characteristics and sensory sensations of the original food. Based on this, as the fat substitute, the PCNF emulsion should maintain the functional characteristics of the product (mass, volume and symmetry of the cakes), and maintain the taste, the texture and the color of the cakes compared with the control cakes.

Figure 6:
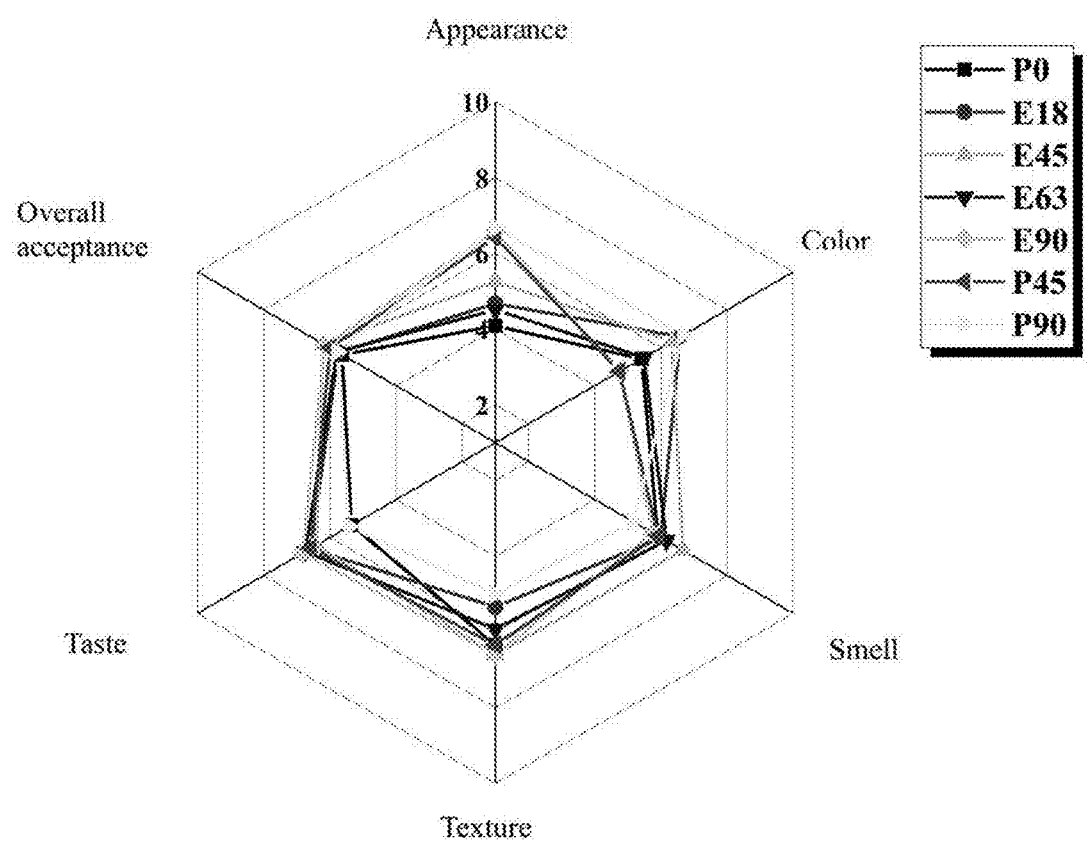
FIG. 6 shows a sensory evaluation view of cakes made in the embodiment.

The results in FIG. 6 show that direct replacement with the PCNF emulsion has no significant impact on the quality of the cakes, but it is found in the cakes of the groups P45 and the P90 that the initial fat levels are the same. If the fiber proportion of the PCNFs was high (group P90), the texture of the cakes will become worse, that is, the softness and the elasticity will become smaller, and the cakes will become rough in taste. In other studies, it has also been observed that the increase of addition amount of the fiber will lead to poor product quality. There is no significant difference in overall acceptance of all the cakes. The results showed that replacing the fat in the cakes with the PCNF emulsion, as the fat mimetic, can maintain the function and sensory characteristics of the original cake products.

What is claimed is:

1. A method of using a nanofiber emulsion in baked food, the nanofiber emulsion being a nanofiber emulsion of a pomelo peel sponge layer, and being an emulsion obtained by emulsification of a nanofiber emulsion stabilizer of the pomelo peel sponge layer and an oil phase, the method comprising:
1) Mixing the pomelo peel sponge layer with water, and adjusting pH to 1.5-2.0 for a reaction to obtain A;
2) Mixing the A with an 8% sodium hydroxide solution for reaction to obtain cellulose of the pomelo peel sponge layer;
3) Mixing the cellulose of the pomelo peel sponge layer with water in a mass ratio of 1:200, and performing homogenizing and cycling 10 times at 1400 bar, to obtain a suspension of cellulose nanofibers of the pomelo peel sponge layer;
4) Mixing the suspension of the cellulose nanofibers of the pomelo peel sponge layer with the oil phase, and performing ultrasonic emulsification to obtain the nanofiber emulsion of the pomelo peel sponge layer, wherein in the nanofiber emulsion of the pomelo sponge layer, the concentration of the suspension of the cellulose nanofibers of the pomelo peel sponge layer is 0.05-0.8 wt %, and a proportion of the oil phase is 5-60 wt %; and the oil phase is one or more of soy bean oil, peanut oil, corn oil, and sunflower seed oil; and
5) using the nanofiber emulsion to replace 45-63 wt % of fat in traditional baked food.

2. The method according to claim 1, wherein the baked food is bread or a cake.

3. The method according to claim 1, wherein the nanofiber emulsion is used in the baked food, for improving bubble density and consistency coefficients of batter formed in an early stage.

4. The method according to claim 1, wherein the nanofiber emulsion is used in cakes, thereby improving texture characteristics and thermodynamic characteristics of the cakes.

* * * * *